(12) United States Patent
Ko

(10) Patent No.: US 7,800,249 B1
(45) Date of Patent: Sep. 21, 2010

(54) POWER SUPPLY SYSTEM

(75) Inventor: Ti-Hua Ko, Taipei (TW)

(73) Assignee: Well Shin Technology Co., Ltd., Taipei (TW)

( * ) Notice: Subject to any disclaimer, the term of this patent is extended or adjusted under 35 U.S.C. 154(b) by 0 days.

(21) Appl. No.: 12/477,132

(22) Filed: Jun. 3, 2009

(51) Int. Cl.
H02J 1/00 (2006.01)

(52) U.S. Cl. ........................................ 307/66
(58) Field of Classification Search ............... 307/64, 307/66; 361/84, 18; 320/121
See application file for complete search history.

(56) References Cited

U.S. PATENT DOCUMENTS

| 3,757,795 A * | 9/1973 | Anderson ............... 607/12 |
| 5,309,031 A * | 5/1994 | Stewart et al. ........... 307/66 |
| 5,784,626 A * | 7/1998 | Odaohara ............... 713/300 |
| 6,038,473 A * | 3/2000 | Olson et al. ............... 607/5 |
| 6,225,708 B1 * | 5/2001 | Furukawa et al. ......... 307/66 |
| 6,333,570 B1 * | 12/2001 | Ilg ........................ 307/75 |
| 6,611,410 B1 * | 8/2003 | Makaran .................. 361/84 |
| 6,825,577 B2 * | 11/2004 | Soto et al. ............... 307/64 |
| 7,405,495 B2 * | 7/2008 | Guillarme et al. ........ 307/82 |
| 7,408,267 B2 * | 8/2008 | Yamashita et al. ........ 307/10.1 |
| 7,486,049 B2 * | 2/2009 | Wan ..................... 320/134 |
| 7,504,750 B2 * | 3/2009 | Bienvenu et al. ......... 307/138 |
| 7,541,694 B2 * | 6/2009 | Chamberlain et al. ..... 307/66 |
| 7,709,976 B2 * | 5/2010 | Bazinet ................. 307/85 |
| 2004/0228053 A1 * | 11/2004 | Thiery et al. ............. 361/84 |
| 2005/0077879 A1 * | 4/2005 | Near .................... 320/166 |
| 2005/0285446 A1 * | 12/2005 | Yamashita et al. ........ 307/66 |
| 2006/0082345 A1 * | 4/2006 | Daniel-Ivad et al. ...... 320/134 |
| 2008/0088280 A1 * | 4/2008 | Wan ..................... 320/136 |
| 2008/0106150 A1 * | 5/2008 | Chamberlain et al. ..... 307/66 |
| 2008/0211456 A1 * | 9/2008 | Bolz et al. .............. 320/116 |
| 2009/0128088 A1 * | 5/2009 | Bourilkov et al. ........ 320/101 |

FOREIGN PATENT DOCUMENTS

JP 05111192 A * 4/1993

* cited by examiner

Primary Examiner—Albert W Paladini
Assistant Examiner—Daniel Cavallari

(57) ABSTRACT

A power supply system includes at least two power input units each adapted to be connected with a power unit, a power output unit for connecting an electric appliance, and a first unidirectional component and a second unidirectional component series-connected between a positive and a negative input terminals of each of the power input units and reverse with each other to respectively block a reverse current produced by a reverse connection of the each of the power units and block a forward current of the each of the power units to flow therefrom. The second unidirectional components are series-connected together between a positive and a negative output terminals of the power output unit to form a unidirectional path. The power input units are series-connected together with the corresponding positive and negative input terminals thereof being substantially short-circuit connected and further directly drawn forth to between the corresponding second unidirectional components.

4 Claims, 5 Drawing Sheets

POWER SUPPLY SYSTEM

BACKGROUND OF THE INVENTION

1. Field of the Invention

The present invention generally relates to a power supply system, and more particularly to a power supply system combining with multiple functions therein.

2. The Related Art

With the development of electronic technology, portable power supply devices are popularly employed for exterior electric appliances. The power supply device acts mainly by means of a power supply system disposed therein. The power supply system can be connected with an exterior direct-power unit so as to make the direct-power unit to provide power for the electric appliance. If the direct-power unit has electrodes reversely connected with the power supply system, some trouble is usually brought about to the electric appliance. So a protecting mechanism is often needed to protect the electric appliance against the reverse connection. Besides, the power supply system generally has a hot swapping function so as to avoid power interruption of the electric appliance during replacing the direct-power unit. However, at present, the power supply system is endowed with only one function of protecting the electric appliance against the reverse connection or the hot swapping function so that results in a poor protection for the electric appliance. Therefore, a power supply system capable of combining with the functions therein is required.

SUMMARY OF THE INVENTION

An object of the present invention is to provide a power supply system adapted for connecting at least one exterior power unit with an exterior electric appliance. The power supply system includes at least two power input units each adapted to be connected with the power unit and having a positive input terminal and a negative input terminal, a power output unit having a positive output terminal and a negative output terminal for connecting the electric appliance, and a first unidirectional component and a second unidirectional component series-connected between the positive input terminal and the negative input terminal of each of the power input units and reverse with each other to respectively block a reverse current produced because of a reverse connection of the each of the power units and block a forward current of the each of the power units to flow therefrom. The second unidirectional components are series-connected together between the positive output terminal and the negative output terminal of the power output unit to form a unidirectional path, and the power input units are series-connected together with the corresponding positive and negative input terminals of the power input units being substantially short-circuit connected and further directly drawn forth to between the corresponding second unidirectional components.

As described above, the power supply system of the present invention utilizes the cooperation of the unidirectional components to not only accomplish the protection for the electric appliance against the reverse connection of the direct-power unit, but also accomplish a hot swapping function. Therefore, the power supply system of the present invention can protect the electric appliance very well.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
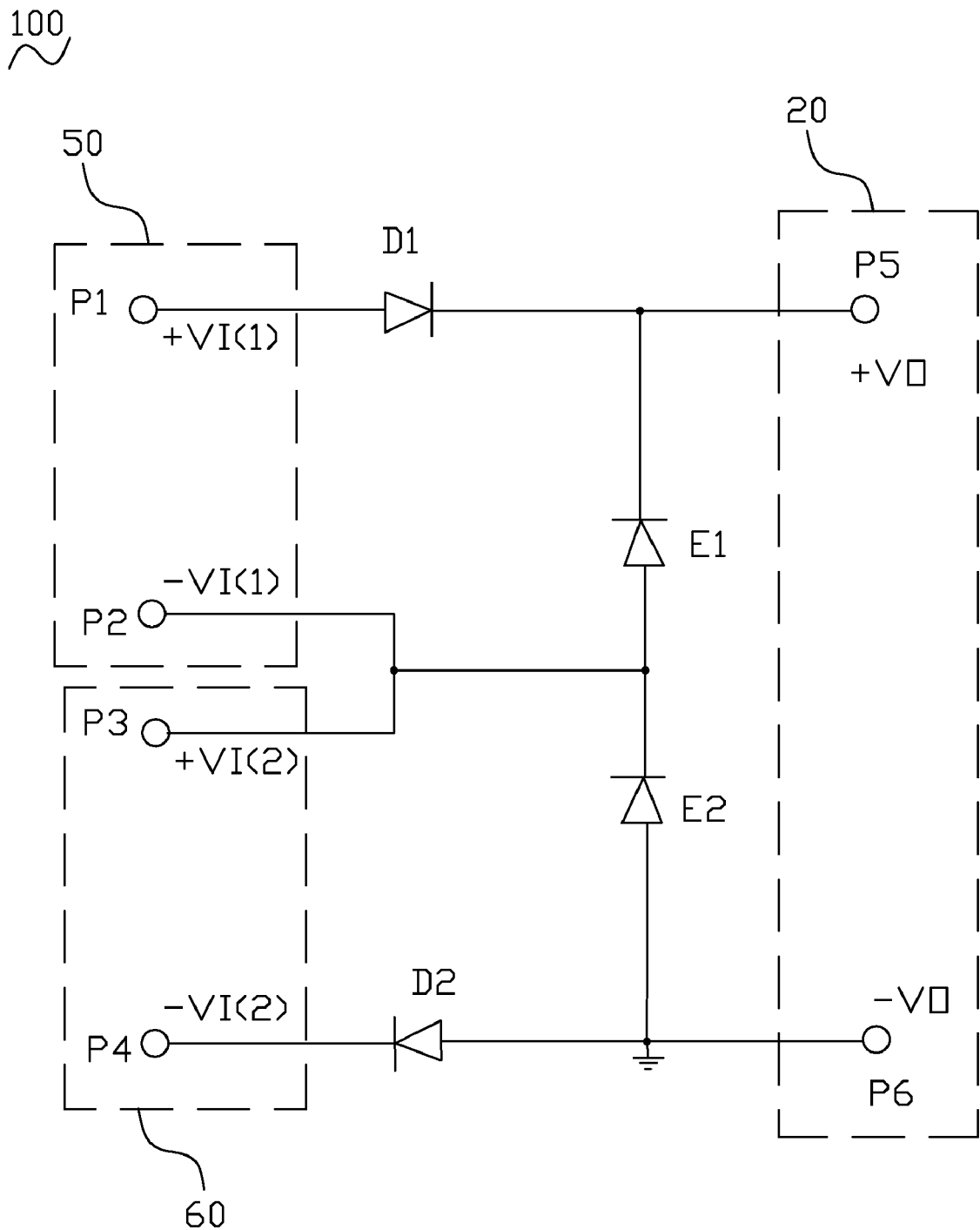
FIG. 1 is a circuitry of a power supply system according to a first embodiment of the present invention.

With reference to FIG. 1, a power supply system 100 according to a first embodiment of the prevent invention includes two first unidirectional components D1, D2, two second unidirectional components E1, E2 and a power output unit 20, wherein the unidirectional component is a component allowing current to flow in a forward direction and blocking current in a reverse direction as long as the voltage thereon does not exceed a predetermined threshold.

The second unidirectional components E1, E2 are connected with each other in series and further connected between the first unidirectional components D1, D2. In the first embodiment, the unidirectional components D1, D2, E1, E2 are diodes. The cathode of the first unidirectional component D1 is connected with the cathode of the second unidirectional component E1, the anode of the first unidirectional component D2 is connected with the anode of the second unidirectional component E2 and further connected to ground, and the anode of the second unidirectional component E1 is connected with the cathode of the second unidirectional component E2.

Figure 4:
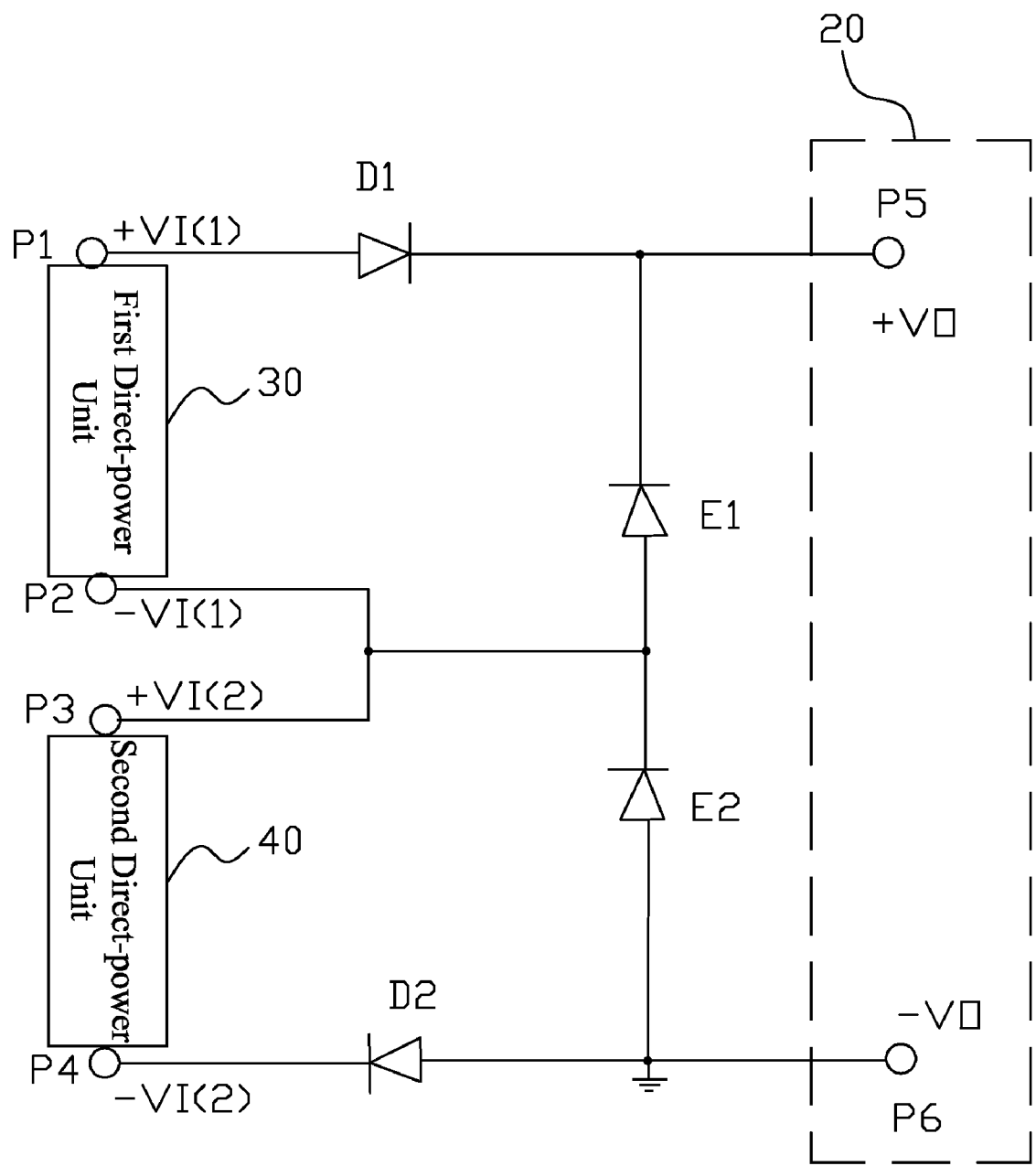
FIG. 4 is a circuitry of the power supply system of FIG. 1, showing that both the first direct-power unit and the second direct-power unit are connected thereto.

Referring to FIG. 1 and FIG. 4, the anode of the first unidirectional component D1 is connected to a first positive input terminal P1, the connection location of the second unidirectional components E1, E2 is drawn forth to be respectively connected to a first negative input terminal P2 and a second positive input terminal P3, and the cathode of the first unidirectional component D2 is connected to a second negative input terminal P4. The first positive input terminal P1 and the first negative input terminal P2 together define a first power input unit 50 which can be connected with an exterior first direct-power unit 30, and the second positive input terminal P3 and the second negative input terminal P4 together define a second power input unit 60 which can be connected with an exterior second direct-power unit 40.

Referring to FIG. 1 again, the power output unit 20 includes a positive output terminal P5 and a negative output terminal P6 electrically connected with an exterior electric appliance (not shown). The positive output terminal P5 is connected at the connection location of the first unidirectional component D1 and the second unidirectional component E1, and the negative output terminal P6 is connected at the connection location of the first unidirectional component D2 and the second unidirectional component E2.

Figure 2:
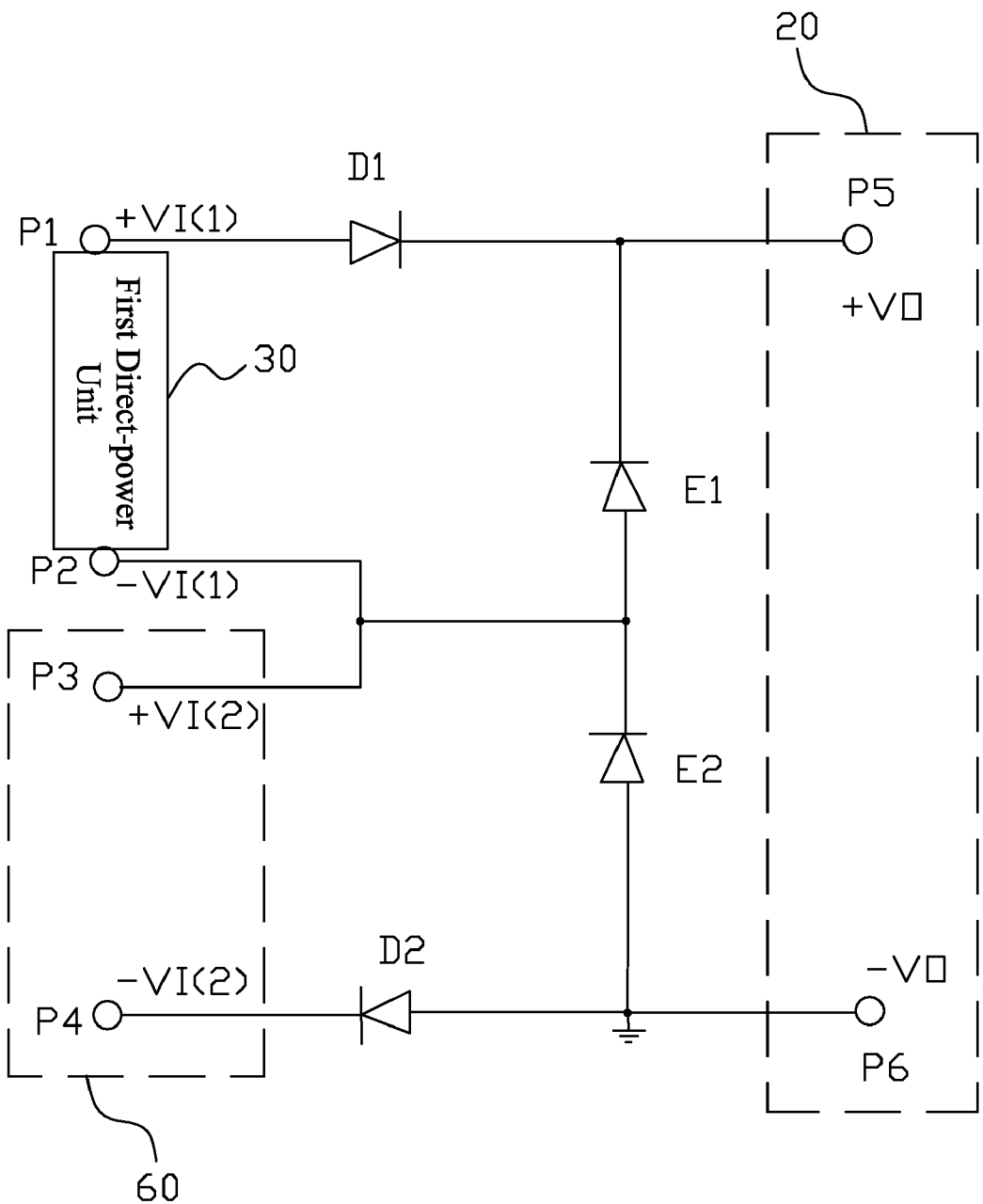
FIG. 2 is a circuitry of the power supply system of FIG. 1, showing that a first direct-power unit is connected thereto.
Figure 3:
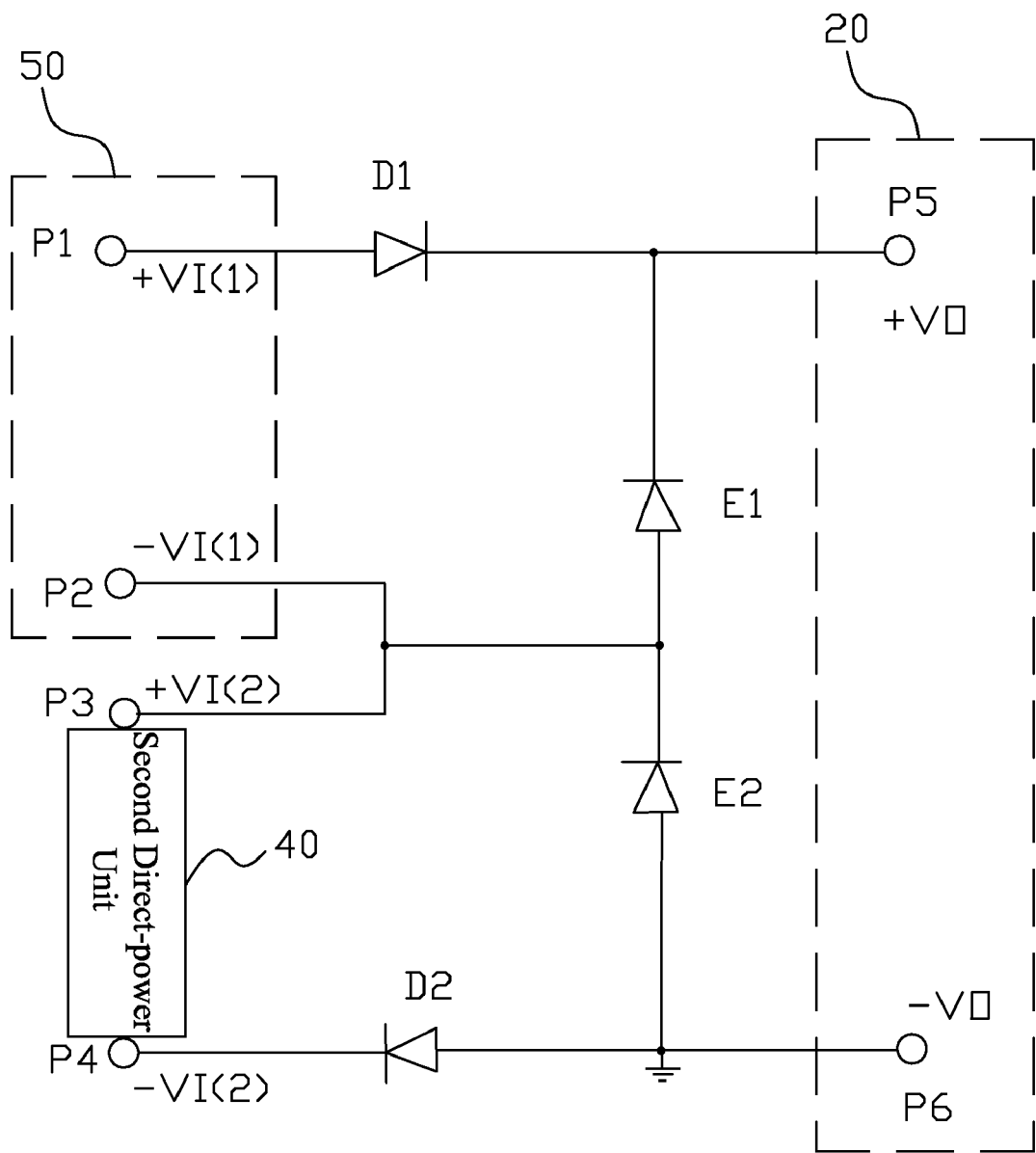
FIG. 3 is a circuitry of the power supply system of FIG. 1, showing that a second direct-power unit is connected thereto.

Referring to FIGS. 2-4, when the direct-power unit is rightly connected to the power supply system 100, namely, the positive electrode of the first direct-power unit 30 is connected with the first positive input terminal P1 and the negative electrode thereof is connected with the first negative input terminal P2, the positive electrode of the second direct-power unit 40 is connected with the second positive input terminal P3 and the negative electrode thereof is connected with the second negative input terminal P4, the flow direction of the current is described as following.

(1) If there is only the first direct-power unit 30 rightly connected between the first positive and negative input terminals P1, P2 of the power supply system 100 (shown in FIG. 2), then the current will flow in the following direction: the positive electrode of the first direct-power unit 30→the first positive input terminal P1→the first unidirectional component D1→the positive output terminal P5→the electric appliance→the negative output terminal P6→the second unidirectional component E2→the first negative input terminal P2→the negative electrode of the first direct-power unit 30.

(2) If there is only the second direct-power unit 40 rightly connected between the second positive and negative input terminals P3, P4 of the power supply system 100 (shown in FIG. 3), then the current will flow in the following direction: the positive electrode of the second direct-power unit 40→the second positive input terminal P3→the second unidirectional component E1→the positive output terminal P5→the electric appliance→the negative output terminal P6→the first unidirectional component D2→the second negative input terminal P4→the negative electrode of the second direct-power unit 40.

(3) If there are both the first direct-power unit 30 and the second direct-power unit 40 rightly connected to the power supply system 100 (shown in FIG. 4), then the current will flow in the following direction: the positive electrode of the first direct-power unit 30→the first positive input terminal P1→the first unidirectional component D1→the positive output terminal P5→the electric appliance→the negative output terminal P6→the first unidirectional component D2→the second negative input terminal P4→the negative electrode of the second direct-power unit 40.

Referring to FIGS. 2-4 again, when the direct-power unit is reversely connected to the power supply system 100, namely, the positive electrode of the first direct-power unit 30 is connected with the first negative input terminal P2 and the negative electrode thereof is connected with the first positive input terminal P1, the positive electrode of the second direct-power unit 40 is connected with the second negative input terminal P4 and the negative electrode thereof is connected with the second positive input terminal P3, the power supply system 100 can protect the electric appliance from being damaged due to the reverse connection of the direct-power unit. The detailed protection means is described as following according to different reverse connection circumstances.

(1) If there is only either the first direct-power unit 30 or the second direct-power unit 40 provided to the power supply system 100, and moreover, reversely connected with the power supply system 100, then the corresponding first unidirectional component D1/D2 will be in a reverse-biased (non-conducting) state to cause the first/second direct-power unit 30/40 to have no effect upon the electric appliance so that protects the electric appliance against the reverse connection of the first/second direct-power unit 30/40.

(2) If there are both the first direct-power unit 30 and the second direct-power unit 40 provided to the power supply system 100, and moreover, one of the first and second direct-power units 30, 40 is rightly connected with the power supply system 100 and the other is reversely connected with the power supply system 100, for instance, the first direct-power unit 30 is rightly connected between the first positive and negative input terminals P1, P2, and the second direct-power unit 40 is reversely connected between the second positive and negative input terminals P3, P4. As a result, the first unidirectional component D1 is in a forward-biased (conducting) state and the first unidirectional component D2 is in the reverse-biased (non-conducting) state so that there is only the first direct-power unit 30 to provide power for the electric appliance and the second direct-power unit 40 has no effect upon the electric appliance. The similar goes for the following circumstance. When the second direct-power unit 40 is rightly connected between the second positive and negative input terminals P3, P4, and the first direct-power unit 30 is reversely connected between the first positive and negative input terminals P1, P2, there is only the second direct-power unit 40 to provide power for the electric appliance and the first direct-power unit 30 has no effect upon the electric appliance. Therefore, the power supply system 100 can protect the electric appliance against the reverse connection of the direct-power unit.

(3) If there are both the first direct-power unit 30 and the second direct-power unit 40 reversely connected to the power supply system 100, then both the first unidirectional components D1, D2 will be in the reverse-biased (non-conducting) state to cause the first and second direct-power units 30, 40 to have no effect upon the electric appliance so that protects the electric appliance against the reverse connection of the first and second direct-power units 30, 40.

The power supply system 100 can further serve for a hot swapping of the first direct-power unit 30 or the second direct-power unit 40, wherein the hot swapping is understood to plug in and pull out the first/second direct-power unit 30/40 without shutting down the power supply system 100. The hot swapping of the first direct-power unit 30 or the second direct-power unit 40 will be described as following.

(1) If the first/second direct-power unit 30/40 is hot-plugged in the power supply system 100, then the corresponding first unidirectional component D1/D2 can restrain an inrush current for protecting the electric appliance on account of a high resistance thereof. After the inrush current ends, the corresponding first unidirectional component D1/D2 will be in the forward-biased (conducting) state so as to make the first/second direct-power unit 30/40 to provide power for the electric appliance. Therefore, the hot plugging of the first/second direct-power unit 30/40 can be accomplished without the trouble about the electric appliance.

(2) If either the first or second direct-power units 30, 40 is hot-pulled out of the power supply system 100, then the corresponding first unidirectional component D1/D2 will be in the reverse-biased (non-conducting) state, but at the same time, the remained direct-power unit can still provide power for the electric appliance. Therefore, the hot pulling of the first/second direct-power unit 30/40 can be accomplished without power interruption to the electric appliance.

Figure 5:
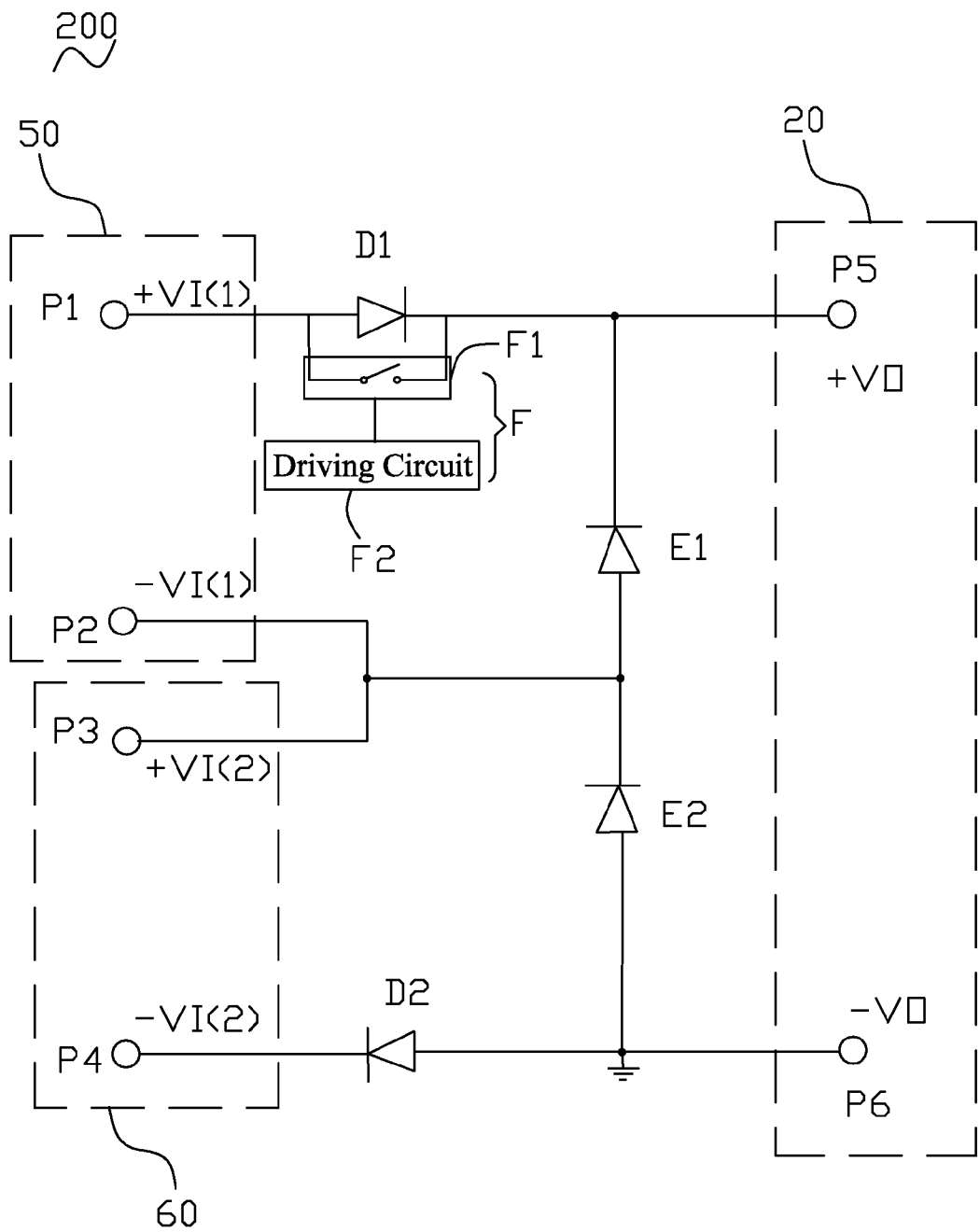
FIG. 5 is a circuitry of a power supply system according to a second embodiment of the present invention.

Referring to FIG. 5, a power supply system 200 according to a second embodiment of the present invention is shown. Comparing to the first embodiment, the difference is that the power supply system 200 further includes a switch control unit F. The switch control unit F includes a switch component F1 having a low resistance and parallel-connected to the first unidirectional component D1, and a driving circuit F2 connected to the switch component F1 for driving a switch state of the switch component F1. Wherein when the first direct-power unit 30 is rightly connected between the first positive and negative input terminals P1, P2, the switch component F1 is driven by the driving circuit F2 to be electrically connected, otherwise disconnected.

If the direct-power unit is rightly connected to the power supply system 200, then the flow direction of the current will be broadly similar to that in the first embodiment. The difference is that the current flows through the switch control unit F rather than the first unidirectional component D1 when rightly connecting the first direct-power unit 30. The point is that, if the first direct-power unit 30 is rightly connected between the first positive and negative input terminals P1, P2, then the driving circuit F2 of the switch control unit F can get power from the first direct-power unit 30 so as to drive the switch component F1 to be connected. Because the connected switch component F1 has a lower resistance than the first unidirectional component D1, the current will flow through the switch component F1 rather than the first unidirectional component D1. Furthermore, the switch component F1 can reduce the loss of the electric energy.

If the direct-power unit is reversely connected to the power supply system 200, then the power supply system 200 can protect the electric appliance against the reverse connection of the direct-power unit. The protection means is broadly similar to that in the first embodiment. The difference is that the current flows through the switch control unit F rather than the first unidirectional component D1 when rightly connecting the first direct-power unit 30 and reversely connecting the second direct-power unit 40. If the first direct-power unit 30 is reversely connected between the first positive and negative input terminals P1, P2, then no power will be provided for the driving circuit F2 so that results in the disconnection of the switch component F1, so the first direct-power unit 30 has no effect upon the electric appliance. Therefore, the electric appliance can be still protected under the reverse connection circumstance of the first direct-power unit 30.

The power supply system 200 can also accomplish a hot swapping of the first direct-power unit 30 or the second direct-power unit 40, and the hot swapping means is broadly similar to that in the first embodiment. The difference is that the switch component F1 of the switch control unit F is electrically connected so as to make the first direct-power unit 30 to provide power for the electric appliance after the inrush current ends, when the first direct-power unit 30 is hot-plugged in the power supply system 200.

As described above, the power supply system 100, 200 of the present invention utilizes the cooperation of the four unidirectional components D1, D2, E1, E2 to not only accomplish the protection for the electric appliance against the reverse connection of the direct-power unit, but also accomplish the hot swapping function. Therefore, the power supply system 100, 200 of the present invention can protect the electric appliance very well.

The foregoing description of the present invention has been presented for purposes of illustration and description. It is not intended to be exhaustive or to limit the invention to the precise form disclosed, and obviously many modifications and variations are possible in light of the above teaching. For example, the unidirectional components D1, D2, E1, E2 may be MOSFET (Metal-Oxide-Semiconductor Field Effect Transistor), SCR (Silicon Controlled Rectifier), or the like. Other three same switch control units F can be further provided to be respectively parallel-connected with the first unidirectional components D2, the second unidirectional components E1, E2. Such modifications and variations that may be apparent to those skilled in the art are intended to be included within the scope of this invention as defined by the accompanying claims.

What is claimed is:

1. A power supply system adapted for connecting at least one exterior power unit with an exterior electric appliance, comprising:
   at least two power input units each adapted to be connected with the power unit and having a positive input terminal and a negative input terminal;
   a power output unit having a positive output terminal and a negative output terminal for connecting the electric appliance; and
   a first unidirectional component and a second unidirectional component series-connected between the positive input terminal and the negative input terminal of each of the power input units and reverse with each other to respectively block a reverse current produced because of a reverse connection of the each of the power units and block a forward current of the each of the power units to flow therefrom,
   wherein the second unidirectional components are series-connected together between the positive output terminal and the negative output terminal of the power output unit to form a unidirectional path, the power input units are series-connected together with the corresponding positive and negative input terminals of the power input units being substantially short-circuit connected and further directly drawn forth to between the corresponding second unidirectional components.

2. The power supply system as claimed in claim 1, further comprising a switch control unit parallel-connected to at least one of the unidirectional components for controlling the current to flow therethrough or be cut-off.

3. The power supply system as claimed in claim 2, wherein the switch control unit includes a switch component having a low resistance, and a driving circuit for driving a switch state of the switch component and further controlling the current state.

4. The power supply system as claimed in claim 1, wherein the unidirectional component is diode, MOSFET or SCR.

* * * * *